US010444395B1

(12) United States Patent
Vinegar

(10) Patent No.: US 10,444,395 B1
(45) Date of Patent: Oct. 15, 2019

(54) TUNNEL DETECTION USING A PIPELINE PIG

(71) Applicant: Vinegar Technologies, LLC, Bellaire, TX (US)

(72) Inventor: Harold Vinegar, Bellaire, TX (US)

(73) Assignee: Vinegar Technologies, LLC, Bellaire, TX (US)

(*) Notice: Subject to any disclaimer, the term of this patent is extended or adjusted under 35 U.S.C. 154(b) by 0 days.

(21) Appl. No.: 16/118,187

(22) Filed: Aug. 30, 2018

(51) Int. Cl.
*G01V 3/165* (2006.01)
*G01V 3/02* (2006.01)
*G01V 3/40* (2006.01)
*G01V 3/08* (2006.01)

(52) U.S. Cl.
CPC ............ *G01V 3/165* (2013.01); *G01V 3/02* (2013.01); *G01V 3/081* (2013.01); *G01V 3/40* (2013.01)

(58) Field of Classification Search
CPC .......... G01V 3/165; G01V 3/02; G01V 3/081
USPC ........................................................ 324/345
See application file for complete search history.

(56) References Cited

U.S. PATENT DOCUMENTS

| 3,786,684 A * | 1/1974 | Wiers ................... G01M 3/005 324/220 |
| 4,570,122 A | 2/1986 | Leu |
| 4,769,598 A * | 9/1988 | Krieg .................... G01N 27/902 324/219 |
| 4,835,474 A | 5/1989 | Parra et al. |
| 8,350,570 B2 | 1/2013 | Allouche et al. |
| 2010/0102809 A1 | 4/2010 | May |
| 2010/0238763 A1 | 9/2010 | Gzara et al. |
| 2016/0187524 A1 | 6/2016 | Suhami |

OTHER PUBLICATIONS

Steven D. Sloan et al, Detecting clandestine tunnels using near-surface seismic techniques, Geophysics, vol. 80, No. 5 (Sep.-Oct. 2015).
J.Sefati.Markiyeh et al., Detection of Magnetic Anomaly Using Total Field Magnetometer, International Journal of Advanced Research in Electrical, Electronics and Instrumentation Engineering,vol. 4, Issue 3, Mar. 2015.
T. Mochales et al., Detection of underground cavities by combining gravity, magnetic and ground penetrating radar surveys: a case study from the Zaragoza area, NE Spain, Environ Geol (2008) 53:1067-1077.

(Continued)

*Primary Examiner* — Reena Aurora
(74) *Attorney, Agent, or Firm* — Marc Van Dyke; PhD Patent Ltd.

(57) ABSTRACT

A method and system for detecting a subsurface tunnel includes propelling an instrumented pipeline pig through a horizontal detection conduit, acquiring and analyzing magnetometer measurements and VLF EM resistivity measurements to detect distortions and/or anomalies in the Earth's magnetic field and/or VLF electromagnetic field, respectively, and correlating the data with position data of the pipeline pig to compute a parameter of a tunnel such as, for example, location, size and depth.

16 Claims, 7 Drawing Sheets

(56) References Cited

OTHER PUBLICATIONS

Larry G. Stolarczyk et al., Detection of Underground Tunnels with a Synchronized Electromagnetic Wave Gradiometer, Proceedings vol. 5778, Sensors, and Command, Control, Communications, and Intelligence (C3I) Technologies for Homeland Security and Homeland Defense IV; (2005) https://doi.org/10.1117/12.609623 Event: Defense and Security, 2005, Orlando, Florida, United States.

Eyal Weiss, High Resolution Marine Magnetic Survey of Shallow Water Littoral Area, Sensors 2007, 7, 1697-1712 , 2007 by MDPI www.mdpi.org/sensors.

Dr. Boris Ginzburg, Magnetic anomaly detection systems—target based and noise based approach, International Scientific CNRS Fall School 2012, High Sensitivity Magnetometers ,"Sensors & Applications",4th Edition, Monday-Friday Oct. 22-26, 2012 ,Branville, Normandy, France.

Dwain K. Butler, Microgravimetric and gravity gradient techniques for detection of subsurface cavities, Geophysics. vol. 49, No. 7 (Jul. 1984); p. 1084-1096, 23 Figs.

Mike Senglaub et al, Sensor Integration Study for a Shallow Tunnel Detection System, Sandia Report, Feb. 2010.

Jose L. Llopis et el, Tunnel Detection Along the Southwest U.S. Border, SAGEEP 2005, pp. 430-443.

J.F Vesecky, Tunnel Detection, Jason Technical Report JSR-79-11, SRI International, Apr. 1980.

W. C. Dean, Tunnel Location by Magnetometer, Active Seismic, and Radon Decay Methods Alexandria Laboratories Report No. AL-75-1, Jun. 18, 1975, Alexandria, Virginia USA.

* cited by examiner

BI-DIRECTIONAL PIG

BI-DIRECTIONAL PIG IN
HORIZONTAL CONDUIT

BI-DIRECTIONAL PIG
IN HORIZONTAL CONDUIT

ALTERNATIVE EMBODIMENTS

METHOD FOR REMOTELY DETECTING A LOCATION
OF A SUBSURFACE TUNNEL

S01 Providing a bi-directional pipeline pig loaded with both an onboard Earth's-field magnetometer tool and an onboard very low frequency (VLF) electromagnetic (EM) resistivity subsurface-survey tool

S02 pneumatically or hydraulically propelling the bi-directional pipeline pig, back-and-forth, within an enclosing non-magnetic and non-electrically conductive horizontal detection-conduit so as to cause the pipeline pig to make multiple traversals of a portion of the horizontal detection-conduit in each direction

S03 for each traversal of the multiple traversals:
ii. acquiring magnetometer data by measuring distortions in the Earth's magnetic-field due to magnetic anomalies in external locations;
ii. acquiring VLF EM resistivity data by measuring, a distortion of the VLF electromagnetic field caused by the presence of the tunnel at an external location; and
iii. monitoring an instantaneous position of the pipeline pig as it moves through the portion of the horizontal detection-conduit

S04 computing a location of the tunnel from (i) both of the magnetometer data and the VLF EM resistivity data and (ii) correlations between the pig-position data and both of the magnetometer data and the VLF EM resistivity data

Fig. 6

TUNNEL DETECTION USING A PIPELINE PIG

FIELD OF THE INVENTION

The present invention relates to a system and method for detecting subsurface anomalies. In particular, the present invention is suitable for detecting subsurface tunnels.

BACKGROUND

Subsurface tunnels can be used for illicit activities such as cross-border smuggling of people, weapons and/or drugs, and therefore there is an ongoing need for methods and apparatus for cost-effective techniques for accurately detecting locations and other parameters of subsurface tunnels, preferably in real-time or near real-time. It may be important to detect not only the presence and location of tunnels but also temporal changes in their dimensions. Towards this end, it might be useful to detect subsurface tunnels from a detection device at a variety of locations rather than from a single location.

Pipeline pigs are known in the art for separating between different fluids flowing through a pipeline, for internal cleaning of pipelines, and for inspection of the physical condition of the pipeline itself (e.g., for detecting cracks and leaks). Embodiments of the present invention disclose the adaptation of a pipeline pig tool for detecting subsurface tunnels, and methods and system for its use.

SUMMARY

The present invention relates to detecting subsurface tunnels by an in-motion detection device (or detection devices) within a horizontal conduit. A system and method are disclosed where data descriptive of the subsurface is acquired by one or more detection devices as the one or more detection devices move through a horizontal detection-conduit such as, for example, a pipeline. This data can be processed to determine a presence of subsurface anomalies and specifically of subsurface tunnels.

In some embodiments, in addition to the presence and location of the subsurface tunnel, it is possible to measure a shape of the tunnel and/or a size thereof and/or depth thereof and/or a distance between the anomaly and the horizontal detection conduit.

Examples of detection devices that may be employed include but are not limited to quantum magnetometers, quantum magnetic-gradiometers, electromagnetic induction-logging sondes, very low frequency electromagnetic resistivity tools and acoustic detection tools comprising an acoustic transmitter (or transceiver) and an acoustic receiver. Each detection device provides different advantages.

In embodiments related to detection by quantum magnetometer or magnetic-gradiometer, it may be preferable to employ a horizontal detection conduit—e.g. constructed from a non-magnetic and/or non-electrically conductive material. In embodiments related to detection by an induction logging tool or a very low-frequency electromagnetic resistivity tool, it may be preferable to employ a horizontal detection conduit constructed from a non-metallic material. In embodiments related to acoustic detection, it may be preferably to employ a liquid-filled horizontal detection conduit (e.g. filled with an aqueous liquid such as a brine) located within a horizontal wellbore that is cemented within the wellbore (e.g. cement filling locations within the wellbore outside of the horizontal detection conduit).

In different examples, the presently disclosed techniques allow for measurement of subsurface anomalies in a manner that minimizes systematic as well as random measurement errors. By significantly reducing the measurement errors, it is possible to significantly increase the range at which anomalies (or properties thereof) may be detected. This may be useful, for examples, where it is desired to reduce the cost by using fewer horizontal conduits to 'cover' a target region where it is desired to detect the anomalies.

Motion through the horizontal conduit tends to provide a smooth motion that reduces random noise and facilitates repeatability of measurement; in contrast to techniques where the tool is mounted to a car or airplane or other moving vehicle outside of a conduit, when a tool is constrained to move through a horizontal conduit motion is more likely to be smooth with less jitter.

In order to reduce random error, it is suggested to perform 'data stacking' whereby measurements from the identical location are repeated a number of times to generate a large dataset. In order to properly 'stack' measurement data, measurements of subsurface properties need to be repeatable for many locations. Use of the horizontal conduit provides this advantage. In addition, techniques for regulating movement of the detection device with a high degree of accuracy, and techniques for accurately measuring a location of the detection device are presently disclosed and/or are known in the art.

Without limitation, teachings borrowed from the art of pipeline pigging may be employed to detect subsurface anomalies in general, and more specifically, elongated cavities or property(ies) thereof. It is known in the art to mount acoustic tools or induction-based tools within a bidirectional pipeline pig in order to measure physical properties of the enclosing steel pipeline itself. However, there is no disclosure or suggestion in the prior art of employing a tool mounted in a pig within a horizontal conduit to measure properties of the subsurface, i.e., of the environment outside of the pipeline pig: for example, at locations distanced from the conduit by at least 1 or at least 3 or at least 5 or at least 10 meters.

In some embodiments, in order to reduce costs, the horizontal conduit could be spoolable, and then unspooled as it is deployed. For embodiments where the detection tool performs magnetic readings of the subsurface (e.g. magnetometers or magnetic-gradiometer), the horizontal conduit is preferably constructed of a non-magnetic material. Examples of non-magnetic materials include but are not limited to fiberglass, rubber, polyvinyl chloride (PVC), HDPE (high density polyethylene), and non-magnetic metals such as copper, brass, aluminum, phosphor bronze and austenitic stainless steel. Spoolable plastic pipes are known in the art.

Thus, in one use, a spoolable horizontal conduit is deployed at or near the surface (e.g. in a trench such as an open trench) in a region where there is reason to believe that a subsurface tunnel may lie beneath the surface. After the detection tool moves through the spoolable conduits, it is possible to 'reuse' the spoolable conduit by pulling it back around the spool, and then deploying it elsewhere.

A method for remotely detecting a location of a subsurface tunnel according to embodiments is disclosed. The method comprises providing a bi-directional pipeline pig loaded with both an onboard Earth's-field quantum magnetometer tool and an onboard very low frequency (VLF) electromagnetic (EM) resistivity subsurface-survey tool, and pneumatically or hydraulically propelling the bi-directional pipeline pig, back-and-forth, within an enclosing non-magnetic and non-electrically conductive horizontal detection-conduit so as to cause the pipeline pig to make multiple traversals of a portion of the horizontal detection-conduit so that one or more of the traversals are in a first direction and one or more of the traversals are in a second direction which is opposite to the first direction. For each traversal of the multiple traversals, the method additionally comprises: acquiring magnetometer data by measuring, using the onboard Earth's-field quantum magnetometer tool, distortions in the Earth's magnetic-field due to magnetic anomalies in locations that are both external to, and not in contact with, the horizontal detection-conduit; acquiring VLF EM resistivity data by measuring, using the onboard VLF EM resistivity subsurface-survey tool, a distortion of the VLF electromagnetic field caused by the presence of the tunnel at an external location located outside of the horizontal detection-conduit; and monitoring an instantaneous position of the pipeline pig as it moves through the portion of the horizontal detection-conduit to acquire pig-position data. The method additionally comprises computing a location of the tunnel from (i) both of the magnetometer data and the VLF EM resistivity data and (ii) correlations between the pig-position data and both of the magnetometer data and the VLF EM resistivity data. In some embodiments of the method, the tunnel is displaced from the horizontal detection-conduit by a displacement distance $CT_{DISPLACEMENT}$ which has a value of at least 1 mete. The value can be at least 3 meters. The value can be at least 5 meters.

In some embodiments, the detected tunnel is displaced from the non-magnetic horizontal detection-conduit by a conduit-tunnel displacement distance $CT_{DISPLACEMENT}$; and a ratio of ($CT_{DISPLACEMENT}$ divided by $CONDUIT_{WIDTH}$) between the conduit-tunnel displacement distance $CT_{DISPLACEMENT}$ and a width $CONDUIT_{WIDTH}$ of the horizontal detection-conduit is at least 1. The ratio can be at least 3. The ratio can be at least 5.

In some embodiments, the horizontal detection-conduit is at or above the surface and a depth of the detected tunnel is at least 5 meters. The depth can be at least 10 meters. The horizontal detection-conduit can be in an open trench, and a depth of the detected tunnel can be at least 5 meters. The depth can be at least 10 meters.

In some embodiments, the horizontal detection-conduit comprises a spoolable conduit.

In some embodiments, the magnetometer tool can comprise exactly one magnetometer. In some other embodiments, the magnetometer tool can comprise a magnetogradiometer.

In some embodiments, the computing can include stacking respective position-specific data from the multiple traversals so as to improve the accuracy of the computing; in these embodiments, each of the magnetometer data and the VLF EM resistivity data includes data acquired during a plurality of traversals in each of the first and second directions.

A system for remotely detecting a location of a subsurface tunnel according to embodiments is disclosed. The system comprises a bi-directional pipeline pig disposed within an enclosing non-magnetic and non-electrically conductive horizontal detection-conduit. The bi-directional pipeline pig is operable to traverse, when propelled pneumatically or hydraulically by a propulsion system, a portion of the horizontal detection-conduit in each of a first direction and a second direction which is opposite to the first direction. The bi-direction pipeline pig is also loaded with an onboard Earth's-field magnetometer tool and an onboard very low frequency (VLF) electromagnetic (EM) resistivity subsurface-survey tool. The system additionally comprises a control module for (i) controlling the propulsion system to propel the pipeline pig so as to make multiple traversals of the portion of the horizontal detection-conduit in each of the first and second directions, (ii) causing the onboard magnetometer tool to acquire magnetometer data for each traversal of the multiple traversals by measuring distortions in the Earth's magnetic-field due to magnetic anomalies in locations that are both external to, and not in contact with, the horizontal detection-conduit, (iii) causing the onboard VLF EM resistivity subsurface-survey tool to acquire VLF EM resistivity data for each traversal of the multiple traversals by measuring a distortion of the VLF electromagnetic field caused by the presence of the tunnel at a location external to, and not in contact with, the horizontal detection-conduit, and (iv) monitoring, for each traversal of the multiple traversals, an instantaneous position of the pipeline pig as it moves through the portion of the horizontal detection-conduit, so as to acquire pig-position data. The system additionally comprises a computing module comprising one or more processors and a non-transitory, computer-readable medium containing program instructions. When executed by the one or more processors, the program instructions cause the one or more processors to compute a location of the tunnel from (i) both of the magnetometer data and the VLF EM resistivity data and (ii) correlations between the pig-position data and both of the magnetometer data and the VLF EM resistivity data.

BRIEF DESCRIPTION OF THE DRAWINGS

FIG. 6 is a flowchart of a method for remotely detecting a location of a subsurface tunnel, according to embodiments.

DETAILED DESCRIPTION OF THE EMBODIMENTS

Figure 1A:
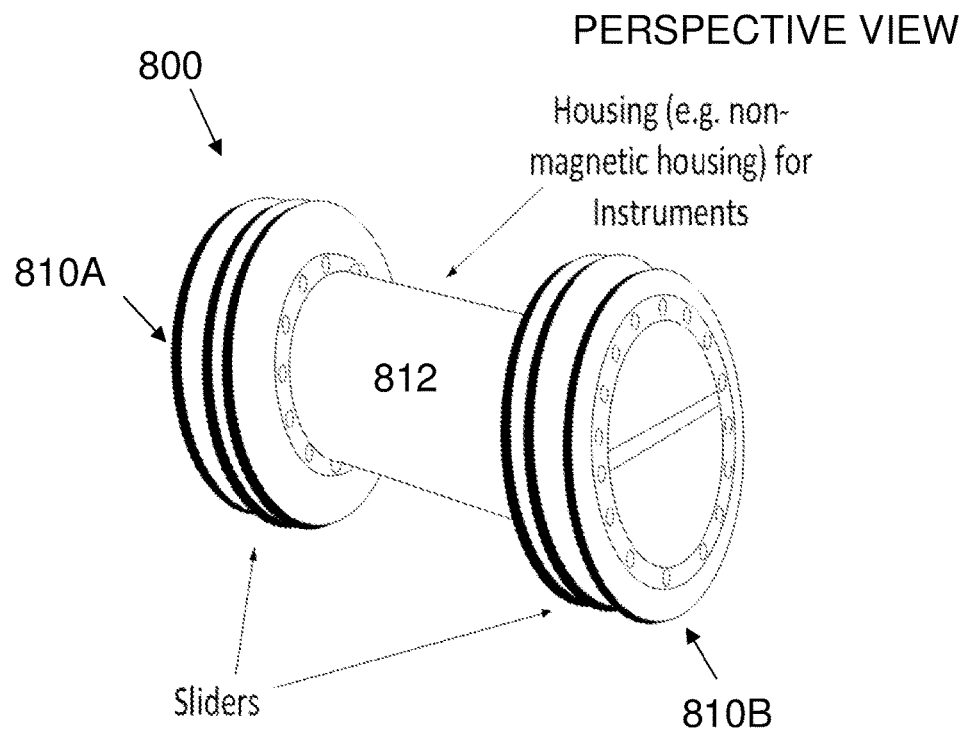
FIGS. 1A and 1B are perspective and elevation-view drawings, respectively, of a pipeline pig according to embodiments.

The invention is herein described, by way of example only, with reference to the accompanying drawings. With specific reference now to the drawings in detail, it is stressed that the particulars shown are by way of example and for purposes of illustrative discussion of the preferred embodiments of the exemplary system only and are presented in the cause of providing what is believed to be a useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice and how to make and use the embodiments.

Note: Throughout this disclosure, subscripted reference numbers (e.g., $10_1$) or letter-modified reference numbers (e.g., $100_A$) may be used to designate multiple separate appearances of elements in a single drawing, e.g. $10_1$ is a single appearance (out of a plurality of appearances) of element $10$, and likewise $100_A$ is a single appearance (out of a plurality of appearances) of element $100$. In either case, an element can be referred to without subscript to mean any or all of the elements, or with subscript to mean a specific occurrence, as in 'the objects $100$ can comprise a first object $100_A$ and a second object $100_B$'.

For brevity, some combinations of various features are not explicitly illustrated in the figures and/or described. It is now disclosed that any combination of the method or device features disclosed herein can be combined in any manner—including any combination of features—any combination of features can be included in any embodiment and/or omitted from any embodiments.

Within this application the following terms should be understood to have the following meaning:

When an object(s) and/or cavity is located in the subsurface, a presence of the object(s) and/or cavity located in the subsurface may distort an external magnetic field such as the Earth's magnetic field or an artificial magnetic field such as that generated by a current-carrying wire (e.g. disposed at the surface or along the horizontal detection conduit).

Furthermore, when the object(s) and/or cavity is located in the subsurface, the object(s) and/or cavity (e.g. ferrous material in the cavity or on a wall or floor or ceiling thereof) may be magnetized by the external magnetic field. After the object and/or cavity become magnetized, object and/or cavity may emit a magnetic field thereof.

The term "magnetic-anomaly data" may refer to differences between (i) a magnetic field due to the presence of the object(s) and/or cavity and (ii) the magnetic field in the hypothetical absence of the object(s) and/or cavity.

The term "magnetic-anomaly data" may refer to: (i) anomalies in the external magnetic field due to the presence of the object(s) and/or cavity in the subsurface; and (ii) the magnetic field emitted by the object(s) and/or cavity after being magnetized by the external magnetic field. The term "magnetic-anomaly data" may refer to a scalar anomaly or to a vector anomaly. In some embodiments, when "magnetic-anomaly data" is acquired, the total scalar magnetic field (i.e. due to the Earth, the presence of the object(s) and/or cavity) is measured with no need to measure a field vector. Alternatively, acquiring the "magnetic-anomaly data" may entail measuring the field vector.

A 'magnetic gradiometer' measures a gradient in at least one direction of a 'magnetic anomaly.' In one example, at least one of the 'directions' may be co-linear with a central axis of the detection conduit. In another example, the at least one of the 'directions' may be perpendicular thereto.

In embodiments, a detection device is moved through a horizontal conduit either within the subsurface (e.g. within a horizontal wellbore) or at the surface (e.g. within a trench), and (ii) as the detection device moves through the horizontal conduit, measurements of subsurface property(ies) are performed by the detection device. Measurement data acquired from the in-motion detection device is analyzed to 'detect the subsurface anomaly.' In preferred embodiments, the horizontal conduit (or horizontal detection-conduit) is an enclosing, substantially hollow pipeline which may or may not contain a fluid, the detection device is an instrumented pipeline pig, or alternatively magnometric, gradiometric and/or electromagnetic instrumentation loaded on a pipeline pig, and the subsurface anomaly is caused by the presence of a subsurface tunnel. The pig is preferably bi-directional, meaning that it can move with substantially equal freedom and/or efficiency and/or speed in both directions within a horizontal longitudinal conduit (e.g., pipeline).

One advantage of trenches is that this solution is less expensive—there is no need to drill a horizontal wellbore. However, subsurface wellbores may be preferred (i.e. instead of, or in addition to, trench-disposed conduits) when the target anomaly is deeper, or when it is desired to detect an anomaly from 'below' (i.e. only from below, or both from above and below), or when there are physical or other (e.g., regulatory, financial or political) obstacles preventing continuous trenching through a selected area of interest.

For the present disclosure, the term 'detecting the subsurface anomaly' or 'detecting the tunnel' may refer to any one of: (i) detecting a presence and/or absence of the subsurface anomaly or tunnel; (ii) detecting an attribute of anomaly or tunnel (e.g. size, shape, a presence of a material within an elongated cavity) and/or (iii) detecting changes in the anomaly (e.g. additional building associated with the expansion or extension of an existing tunnel).

A detection tool may include a magnetometer and/or magneto-gradiometer, which can use any of the known technologies and techniques in the art, and such a tool can comprise, for example any one type of tool in the following non-exhaustive and non-limiting list of examples: a scalar magnetometer such as a proton precession magnetometer, an Overhauser effect magnetometer, a cesium vapor magnetometer, a potassium vapor magnetometer, or a vector magnetometer such as a rotating coil magnetometer, a Hall effect magnetometer, a magneto-resistive device, a fluxgate magnetometer, a SQUID magnetometer, or a spin-exchange relaxation-free (serf) atomic magnetometer. A magnetometer tool can include a quantum magnetometer or a quantum magnetic-gradiometer. A skilled practitioner will appreciate that the selection of a specific magnetometric detection tool or technology can be based on the parameters of a specific case and location, such as required speed and cycle time of measurements, sensitivity, precision, range, power consumption, heat output, cost, programmability, portability, ease of installation and instrumentation, and so on.

In embodiments, a magnetometer can be selected for high sensitivity and the ability to detect elongated subsurface conduits (e.g. tunnels) according to a presence of iron within or on the wall of the conduit. The high sensitivity is useful for reducing measurement noise and extending the range of the anomaly-detection tool. An advantage of a magnetic gradiometer is that diurnal variations in the Earth's magnetic field are cancelled, so a base station is not required. Also, a magnetic gradiometer is more sensitive to nearby anomalies.

Any appropriate mechanism may be used for horizontally moving a pipeline pig through the conduit—in different examples, a wireline system or a hydraulic or pneumatic-based propulsion system or a robotic device or any other mechanism may be used. Nevertheless, there may be particular advantages to employing a compressed-fluid or pressurized-fluid based propulsion system, which is known in the art as a traditionally successful way of propelling a pipeline pig. Motors and pumps and associated equipment may be used in a propulsion system for propelling the pipeline pig.

Figure 1B:
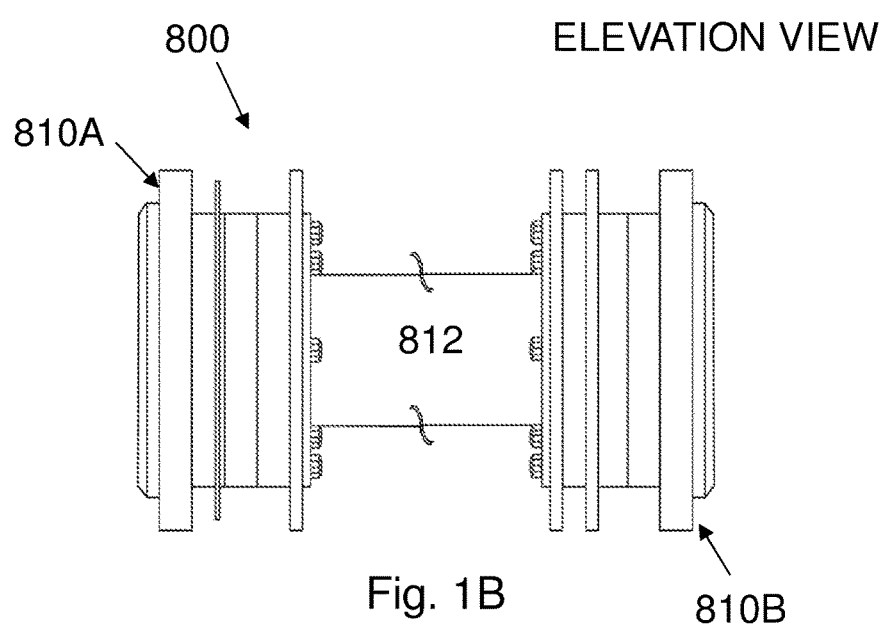

Referring now to the figures, and specifically to FIGS. 1A and 1B, a bidirectional pipeline pig 800 according to embodiments is illustrated in perspective and elevation views, respectively, the pig 800 comprising a pair of sliders (e.g. polyethylene sliders) 810A, 810B and a housing (e.g. a non-magnetic and non-electrically conductive housing) 812 therebetween. For example, the housing 812 may be rigid and fix a distance between sliders 810A, 810B and opposite sides of the housing 812. Detection tools or any portion thereof may be loaded onto the pig device and specifically in the plenum of housing 812. In some preferred embodiments, the housing 812 in which the detection tool resides is non-magnetic so as not to interfere with magnetometric measurements performed by an onboard magnetometer tool if there is one, and/or non-metallic, i.e., not electrically conductive, so as not to interfere with VLF EM resistivity measurements by an onboard VLF EM resistivity subsurface-survey tool if there is one.

Figure 2A:
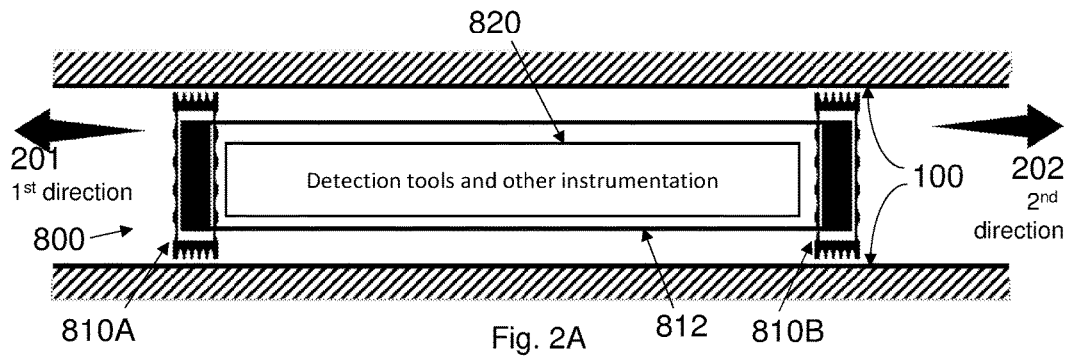
FIGS. 2A through 2D are schematic cross-sectional drawings of pipeline pigs including respective instrumentation loaded thereupon according to various embodiments, each pig disposed in a horizontal detection conduit.

FIG. 2A shows a schematic cross-section of a pipeline pig 800, again comprising housing 812 and sliders 810A, 810B. The pig 800 is disposed in a longitudinally elongated horizontal conduit 100. The pig 800 is designed for bidirectional travel, and as evidenced by the arrows 201 and 202 in FIG. 2A, is operable to travel in a first direction 201 and in a second, opposing, direction 202. By 'operable to' we mean will move smoothly through the horizontal conduit 100 if propelled in a given direction, for example by a propulsion system (NOT SHOWN) using hydraulic or pneumatic pressure. In the example of FIG. 2A, the housing 812 serves as an instrumentation plenum and includes detection tools and other instrumentation, and associated equipment items for powering the instrumentation, for recording data, for communications, and other functions as necessary (all of the above instrumentation and ancillary equipment collectively: 820). This can also include pig-location detection equipment (NOT SHOWN). By 'detection tools' in this disclosure (including in the figures), we mean the various tools for detecting the presence, location, or other parameters of subsurface tunnels. These can include, for example, magnetometer tools, VLF EM resistivity subsurface-survey tools, acoustic tools, ground-penetrating radar, and other tools for detection of subsurface anomalies. In some embodiments, a horizontal conduit 100 can be an existing pipeline. In other embodiments, a horizontal conduit 100 can be a special-purpose conduit placed underground, or near or at the surface for the purpose of tunnel detection. In some embodiments, the horizontal conduit 100 (and specifically the portion thereof which the pig 800 is caused or propelled to traverse, can be longer than 1 kilometer, or longer than 5 km, or longer than 10 km.

Figure 2B:
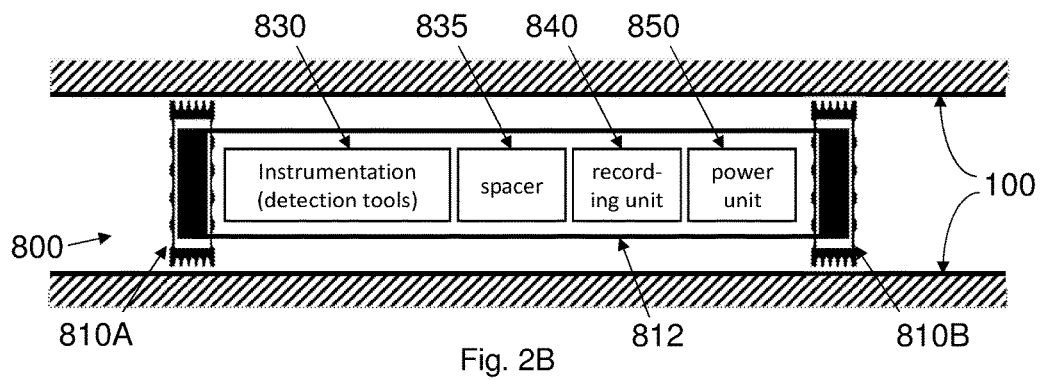

FIG. 2B schematically illustrates a non-limiting example of a possible arrangement of equipment items within housing 812, serving as the instrumentation plenum of pipeline pig 800: Four equipment packages are installed within the housing 812: the detections tools (collectively: 830), a spacer 835, which might be present in order to protect the sensitive measurements of the detection tools 830 from interference from other equipment items, a recording unit 840 for recording data acquired by the detection tools from measurement activities conducted while the pig 800 traverses the horizontal conduit 100, usually in two directions and usually through multiple traversals of the same portion(s) of the horizontal conduit 100. In any of the embodiments of pig 800 disclosed herein, pig-location equipment can be provided for the detection and recordation of pig location in real time as the pig 800 travels.

Figure 2C:
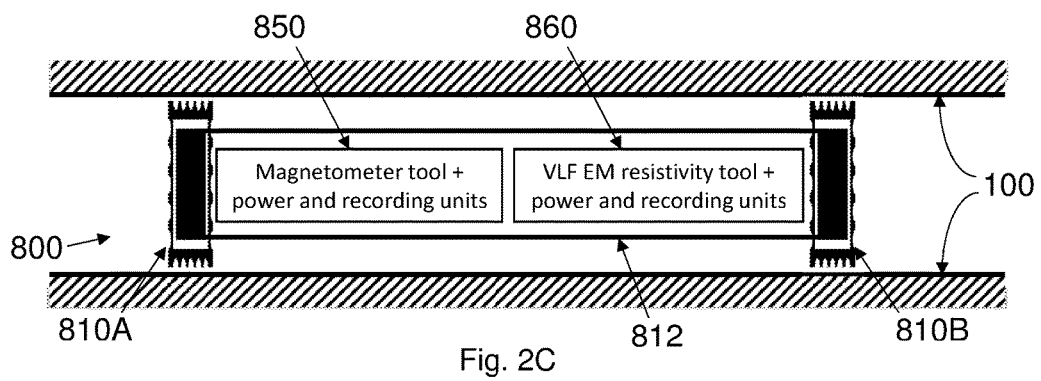

FIG. 2C shows another non-limiting example of a possible arrangement of equipment items within housing 812. In the example of FIG. 2C, a first 'instrumentation package' 850 includes a magnetometer tool along with power and recording units and any other ancillary equipment that may be necessary for proper performance and recordation of magnetometer measurements. In some embodiments, first instrumentation package 850 includes a single magnetometer. In other embodiments, first instrumentation package 850 includes a magneto-gradiometer. Any combination of magnetometers (for example, of two or more different types, or when multiple magnetometers are coupled in magneto-gradiometers) are called 'magnetometer tools' in this disclosure. In the context of this disclosure, magnetometer tools are deployed to measure distortions in the Earth's magnetic field due to magnetic anomalies in locations that are both external to, and not in contact with, a respective horizontal conduit 100. As is known in the art, the presence of magnetic anomalies can indicate the presence of subsurface ferromagnetic materials, such as, for example, iron rebar in concrete that might be used in tunnel construction and reinforcement. In any of the embodiments, first instrument package 850 may or may not include pig-location data detection and recordation equipment. Examples of suitable magnetometer tools include tools incorporating either an FGM3D series three-axis magnetometer or the FGM650 vertical fluxgate gradiometer, both of which are available commercially from SENSYS Sensorik & Systemtechnologies GmbH of Bad Saarow, Germany. Other examples include a G-823A cesium magnetometer from Geometrics of California, USA and a GSMP-35 potassium magnetometer or GSMP-35G potassium gradiometer, or a GSM-19 Overhauser magnetometer or GSM-19G Overhauser gradiometer from GEM Systems of Ontario, Canada.

A second instrumentation package 860, as shown in the FIG. 2C example, can include a VLF EM resistivity subsurface-survey tool along with power and recording units and any other ancillary equipment that may be necessary for proper performance and recordation of VLF EM resistivity measurements. As known in the art, VLF EM survey methods use VLF (very low frequency) radio communication signals to determine electrical properties of the subsurface environment and in particular of near-surface soils. Induced currents (or directly transmitted currents in other applications) cause detectable secondary responses in conductive materials—a VLF anomaly represents a change in the attitude of the electromagnetic vector overlying conductive materials, and thus a VLF EM resistivity subsurface-survey tool can detect the presence of conductive materials such as for, example, electrical wiring used for lighting or ventilation of subsurface tunnels. Deploying both a magnetometer tool and VLF EM resistivity subsurface-survey tool in the same conveyance, e.g., in a pipeline pig 800, broaden the detection capabilities of a tunnel detection system. A magnetometer tool, as discussed, can detect the iron typically used in the construction of concrete tunnel, or, for example transport rails sometimes found in tunnels where heavy equipment or large quantities of materials are transported. The VLF EM resistivity subsurface-survey tool, as discussed, can detect the conductive materials used within any kinds of tunnels—wooden, compacted earth, etc.,—as well as, in some cases, the increased resistivity due to airspaces and/or disturbed subsurface spaces. An example of a suitable VLF EM resistivity subsurface-survey tool is one incorporating the model GSM-19V ground unit, available from GSM Systems of Ontario, Canada.

Figure 2D:
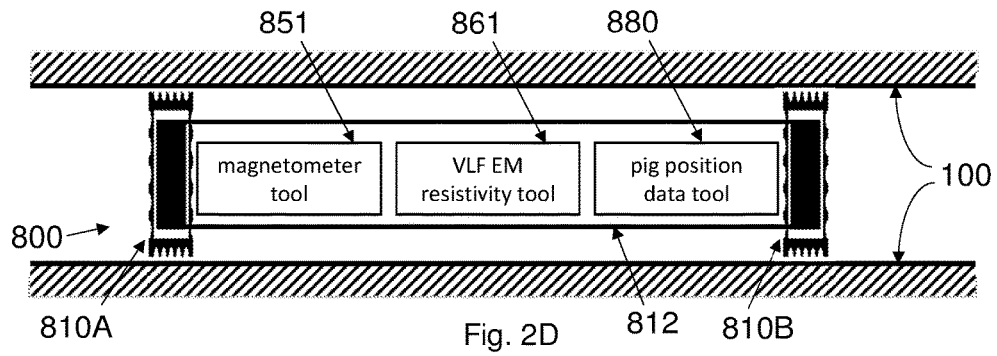

FIG. 2D shows another non-limiting example of a possible arrangement of equipment items within housing 812 of bi-directional pipeline pig 800. In the example of FIG. 2D, magnetometer tool 851, VLF EM resistivity subsurface-survey tool 861, and pig position data tool 880 occupy at least a portion of the plenum of housing 812. Ancillary equipment (NOT SHOWN) also onboard the pig 800 can include, for example, data recordation equipment and power equipment.

The skilled practitioner will appreciate that arrangement of instrumentation and ancillary equipment within the plenum of a pig housing 812 is a matter of design and optimization. Additional elements such as gimbals (e.g., to keep vertical sensor alignment), shock absorbers, leak detectors, and so on may be added according to need.

Figure 3A:
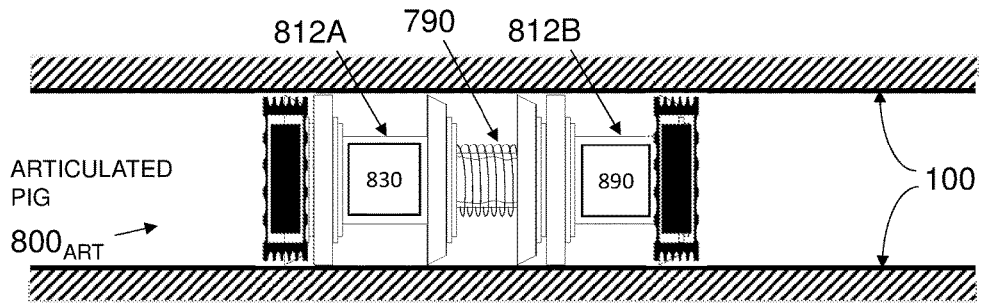
FIGS. 3A and 3B are schematic cross-sectional drawings of articulated and two-part linked pipeline pigs, respectively, including respective instrumentation loaded thereupon according to various embodiments, each pig disposed in a horizontal detection conduit.
Figure 3B:
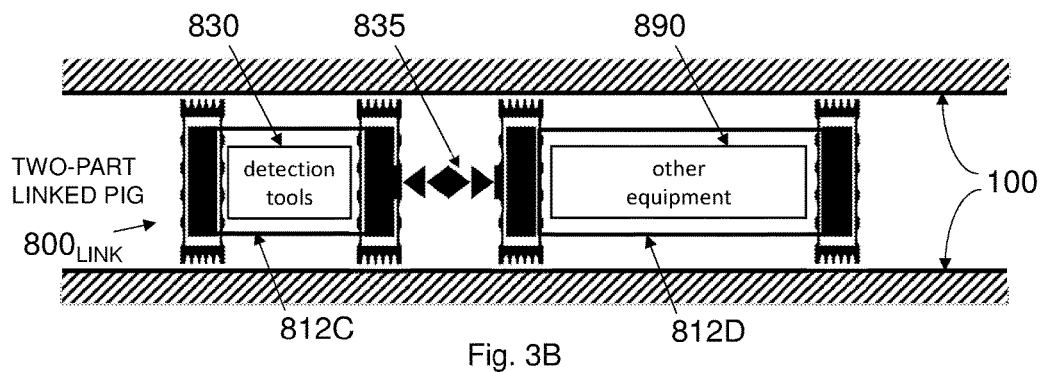

Referring now to FIGS. 3A and 3B, alternative embodiments of pipeline pigs 800 are illustrated. In FIG. 3A, an articulated pipeline pig $800_{ART}$ is shown to include a flexible articulation mechanism 790 which allows the pig $800_{ART}$ to more easily traverse bends and curves in the horizontal conduit 100. This configuration may also be useful for separating detection tools 830, which may be sensitive to electronic interference, from other equipment 890. The articulation mechanism 790 will typically include connections for electricity and communications between the two housings 812A and 812B. The two-part linked pig $800_{LINK}$ shown in FIG. 3B used much the same rationale but instead of articulation actually uses two pipeline pigs connected mechanically (and preferably also electrically and electronically) by means of linking mechanism 835, and thus the two housings 812A and 812B with their respective equipment and instrumentation packages 830 and 890 are completely separated from each other.

Figure 4A:
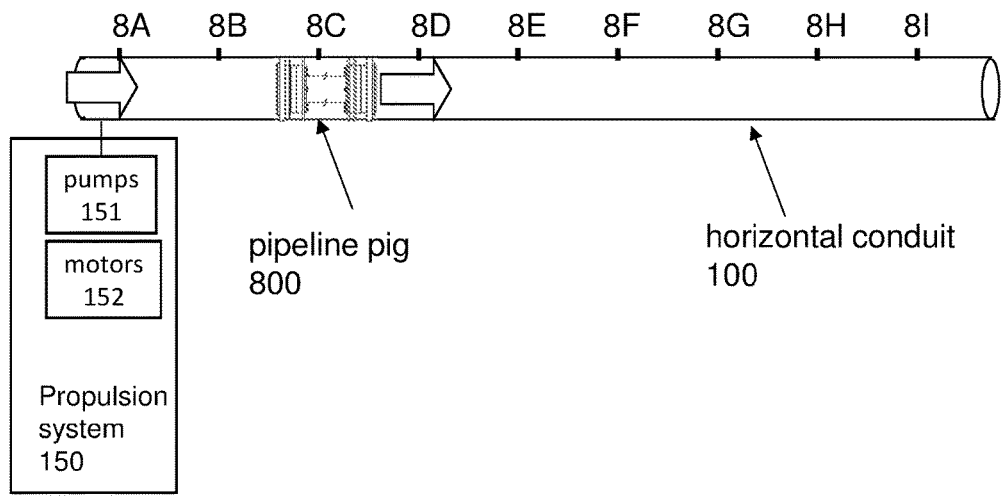
FIG. 4A is a schematic block diagram of a pipeline pig in a horizontal detection conduit, together with marker magnets and a propulsion system, according to embodiments.

The position of the pig 800 can be monitored using any one of various techniques. In an example illustrated schematically in FIG. 4A, the technique of using marker magnets is employed. In the example shown in FIG. 4A, a pipeline pig 800 is propelled by a propulsion system 150 through a horizontal conduit 100 in the direction of travel indicated by the arrows. Propulsion system 150, which includes pumps 151 and motors 152, can be pneumatic or hydraulic. Magnetic markers 8A . . . 8I are placed or attached or installed along the length of the portion of the horizontal conduit through which the pig 800 traverses. Each time the detection tool passes one of the markers 8A . . . 8I, a 'blip' is recorded in magnetic data which can either be the magnetic data acquired by a magnetometer tool such as, for example magnetometer tool 851, or the magnetic data acquired by a pig positioning tool such as, for example, pig positioning tool 880 and the 'blips' may be correlated to the location of the pig 800 as it passes. An example of suitable marker magnets are Rosen heavy-duty marker magnets available from Rosen Swiss AG of Stans, Switzerland. When data about the subsurface acquired by instrumentation onboard the pig 800 is downloaded (e.g. from on-board computer data storage), any subsurface descriptive data (i.e., magnetometer data and the VLF EM resistivity data) may be correlated with the marker-generated position data.

Figure 4B:
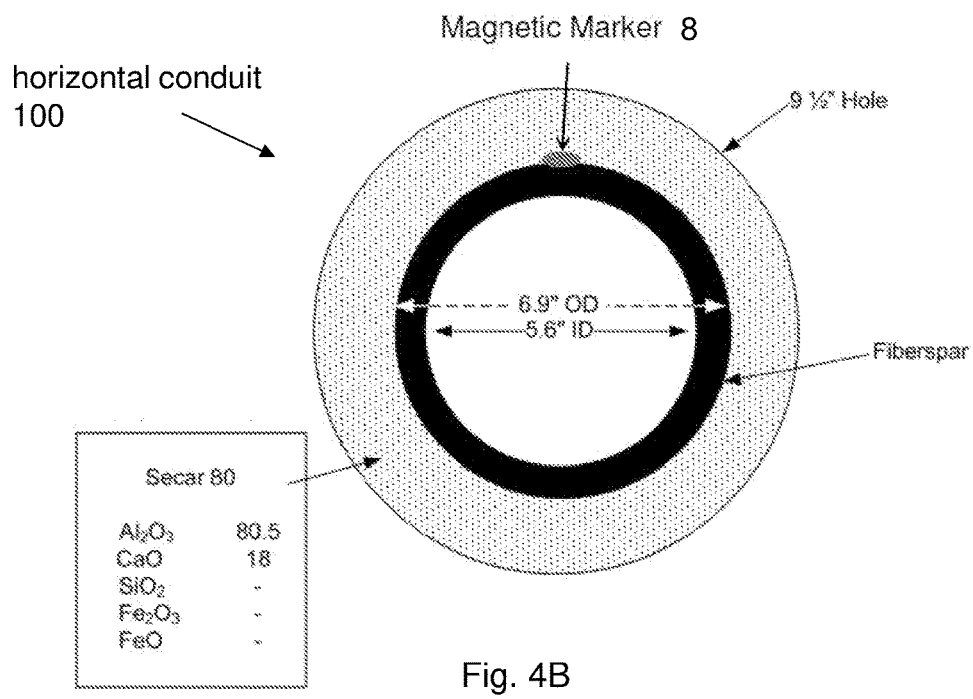
FIG. 4B is a schematic cross section of a pipeline pig showing a marker magnet, according to embodiments.

In some embodiments, the horizontal conduit 100 can comprise a spoolable reinforced plastic conduit. An example of a suitable spoolable plastic conduit can be found in U.S. Pat. No. 6,604,550, the contents of which are incorporated herein by reference in their entirety. A spoolable plastic conduit, which by its nature is not permanently installed in the ground, may be outfitted with magnetic markers so as to be useful in pig position monitoring. FIG. 4B shows a schematic cross-section of such a horizontal conduit 100 comprising a spoolable plastic pipe with a plurality of marker magnets 8 installed thereupon. A spoolable fiberglass line pipe, such as Fiberspar, which is available from National Oilwell Varco of Houston, Tex., USA may be utilized for higher pressures.

Figure 5:
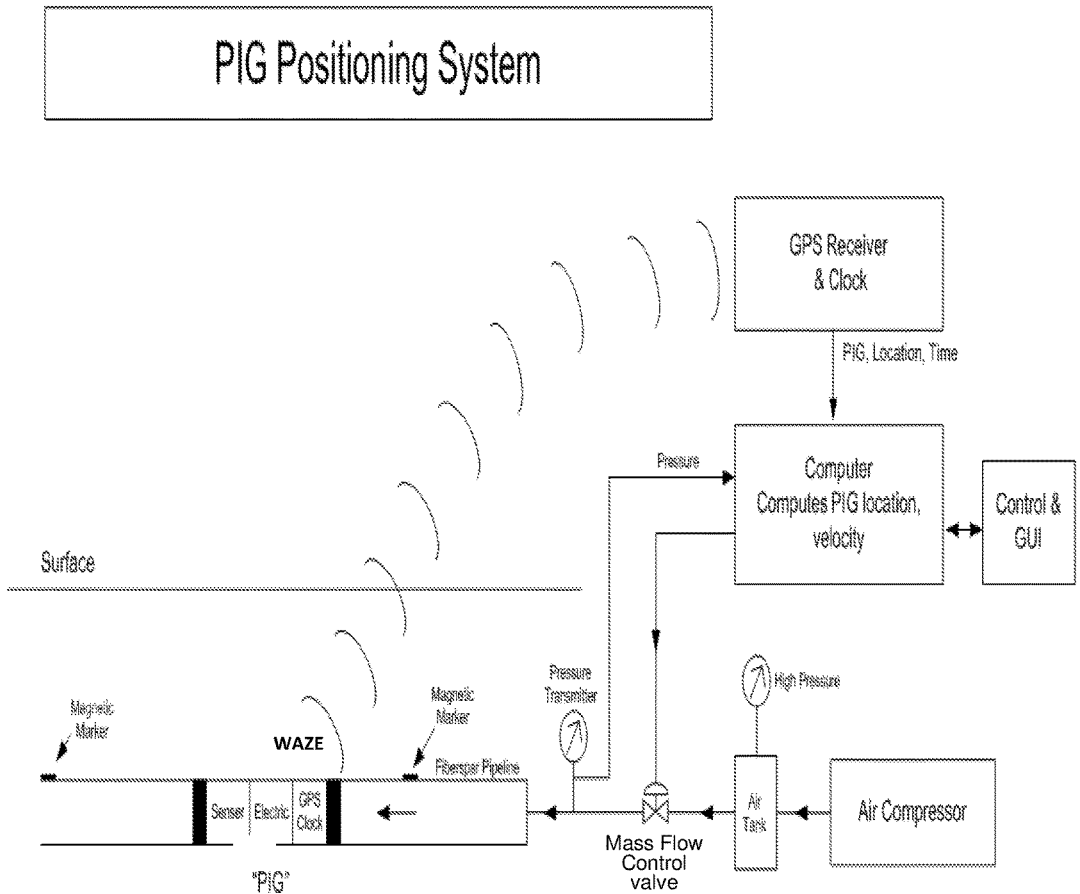
FIG. 5 is a block diagram of a pipeline pig positioning system that uses a mass flow control valve, according to embodiments.

Another non-limiting example of a technique for monitoring the position of a pipeline pig is shown in FIG. 5. FIG. 5 illustrates use of a sensitive mass flow control valve to track an instantaneous location of a detection tool (e.g. on a pipeline pig). Since the pipeline pig 800 is propelled by a pressurized fluid (e.g. a gas), a mass flow control valve measures the amount of fluid supplied. Assuming the temperature within the conduit and the pressure are known, it is possible to relate the amount of mass supplied to the volume of fluid (e.g. a gas) delivered into the horizontal conduit 100 to move the pipeline pig 800 and all of its various instrumentation as discussed above. Changes in position, and hence actual position, may be computed in accordance with the volume of fluid (e.g. gas) delivered into the conduit and the cross-section of the conduit. Some examples of suitable mass flow controllers are those in the REDY SMART series available from Vogtlin Instruments GmbH of Aesch, Switzerland or an Innovaswitch flow switch available from Sierra Instruments of California, USA.

Referring now to FIG. 6, a method, according to embodiments, is disclosed for remotely detecting a location of a subsurface tunnel. The method, as illustrated in the flowchart of FIG. 6, can comprise:
  a. Step S01, providing a bi-directional pipeline pig loaded with both an onboard Earth's-field magnetometer tool and an onboard very low frequency (VLF) electromagnetic (EM) resistivity subsurface-survey tool.
  b. Step S02, pneumatically or hydraulically propelling the bi-directional pipeline pig, back-and-forth, within an enclosing non-magnetic and non-electrically conductive horizontal detection-conduit (such as, for example, a pipeline or a spoolable plastic conduit) so as to cause the pipeline pig to make multiple traversals of a portion of the horizontal detection-conduit in each direction. In some embodiments, the horizontal detection-conduit is in an open (or closed) trench at or near the surface.
  c. Step S03, comprising, for each traversal of the multiple traversals made by the bi-directional pipeline pig, the following sub-steps:
    i. acquiring magnetometer data by measuring distortions in the Earth's magnetic-field due to magnetic anomalies in locations external to, and not in contact with, the horizontal detection-conduit. The measurements are suitably made using an onboard Earth's-field magnetometer tool. The magnetometer tool can comprise exactly one magnetometer or can comprise a magneto-gradiometer.
    ii. acquiring VLF EM resistivity data by measuring a distortion of the VLF electromagnetic field caused by the presence of the tunnel at a location outside of the horizontal detection-conduit. The measurements are suitably made using an onboard VLF EM resistivity subsurface-survey tool.
    iii. monitoring an instantaneous position of the pipeline pig as it moves through the portion of the horizontal detection-conduit to acquire pig-position data. Various techniques are available for monitoring pig position, two of which were discussed earlier.
  d. Step S04 computing a location of the tunnel from (i) both of the magnetometer data and the VLF EM resistivity data and (ii) correlations between the pig-position data and both of the magnetometer data and the VLF EM resistivity data. This can include stacking respective position-specific data from the multiple traversals so as to improve the accuracy of the computing, and particularly when each of the magnetometer data and the VLF EM resistivity data includes data acquired during a plurality of traversals in each direction. The location of the tunnel can be at least 1 meter or at least 3 meters or at least 5 meters away from horizontal detection-conduit, or at least as far away as the width of the horizontal detection-conduit (or at least 3 times as far away, or at least 5 times as far away).

In some embodiments, not all of the steps of the method are necessary.

Figure 7:
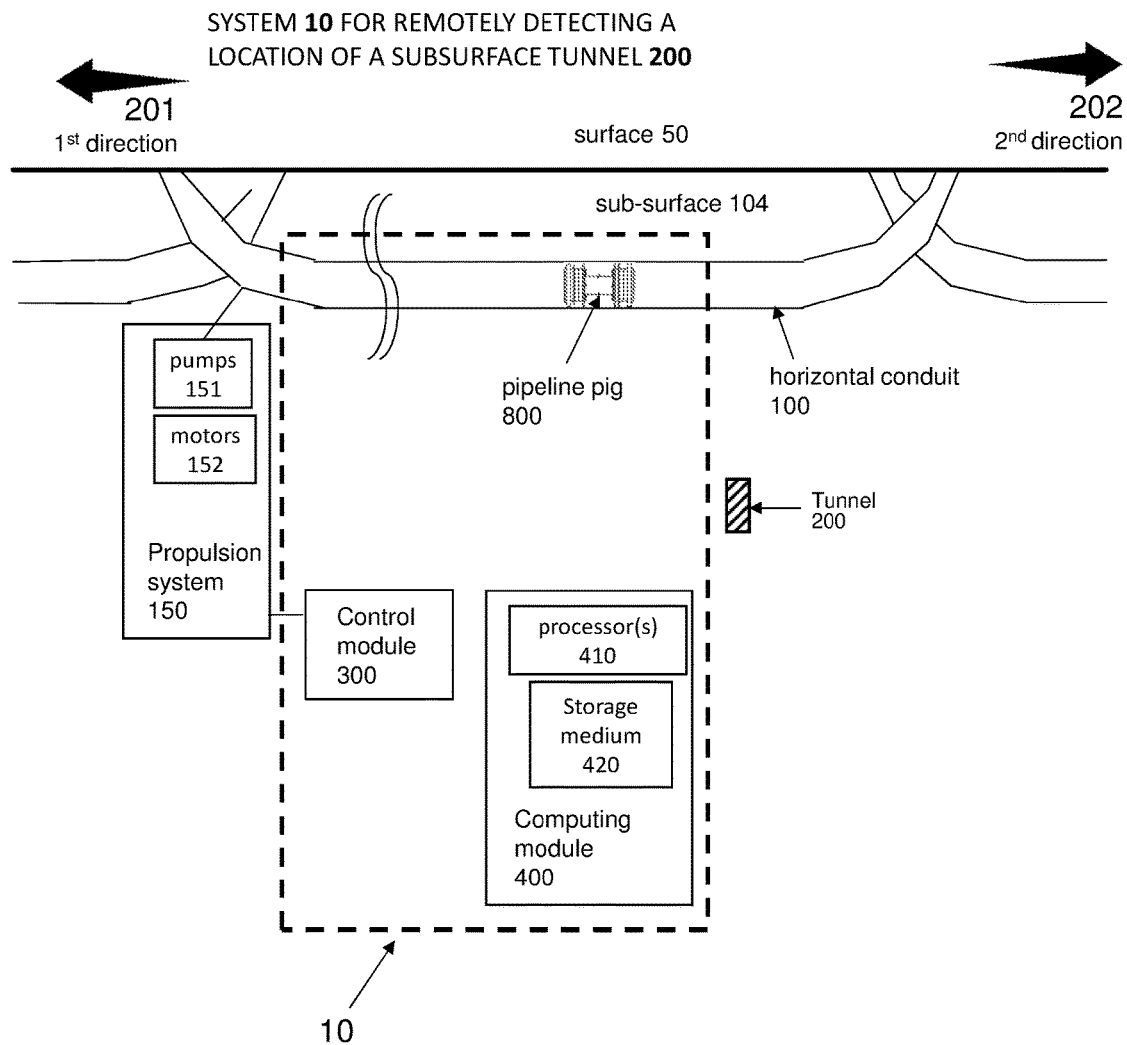
FIG. 7 is a schematic block diagram of a system for remotely detecting a location of a subsurface tunnel, according to embodiments.

Referring now to FIG. 7, a system 10 for detecting a subsurface tunnel 200 can comprise:

a. a bi-directional pipeline pig 800 disposed within an enclosing non-magnetic and non-electrically conductive horizontal detection-conduit 100, the bi-directional pipeline pig 800 being (i) operable to traverse, when propelled pneumatically or hydraulically by a propulsion system 150, a portion of the horizontal detection-conduit 100 in each of a first direction 201 and a second, opposite, direction 202, and (ii) loaded with (A) an onboard Earth's-field magnetometer tool (e.g., 850 in FIG. 2C) and (B) an onboard very low frequency (VLF) electromagnetic (EM) resistivity subsurface-survey tool (e.g., 860 in FIG. 2C).

b. a control module 300. A control module 300 comprises electronic circuitry and can comprise one or more controllers, and can be distributed between different computers and processors. In the present embodiments the control module 300 can have four control functions:

i. controlling the propulsion system 150 to propel the pipeline pig so as to make multiple traversals of the portion of the horizontal detection-conduit 100 in each of the first 201 and second 202 directions.

ii. causing the onboard magnetometer tool (e.g., 850 in FIG. 2C) to acquire magnetometer data for each of the multiple traversals by measuring distortions in the Earth's magnetic-field due to magnetic anomalies in locations in the subsurface 104 that are external to, and not in contact with, the horizontal detection-conduit 100.

iii. causing the onboard VLF EM resistivity subsurface-survey tool (e.g., 860 in FIG. 2C) to acquire VLF EM resistivity data for each traversal of the multiple traversals by measuring a distortion of the VLF electromagnetic field caused by the presence of the tunnel 200 at a location in the sub-surface 104 external to the horizontal detection-conduit 100, and iv. monitoring, for each traversal of the multiple traversals, an instantaneous position of the pipeline pig 800 as it moves through the portion of the horizontal detection-conduit 100, so as to acquire pig-position data, using any of the methods for pig-position monitoring known in the art including those mentioned in this disclosure.

c. a computing module 400. A control module 300 can comprise one or more computer processors 410 and computer-readable storage medium 420 containing program instructions, which, when executed by the one or more processors 410, cause the one or more processors 410 to compute a location of the tunnel 200 from (A) both of the magnetometer data and the VLF EM resistivity data and (B) correlations between the pig-position data and both of the magnetometer data and the VLF EM resistivity data.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

The invention claimed is:

1. A method for remotely detecting a location of a subsurface tunnel, the method comprising:

a. providing a bi-directional pipeline pig loaded with both an onboard Earth's-field magnetometer tool and an onboard very low frequency (VLF) electromagnetic (EM) resistivity subsurface-survey tool;

b. pneumatically or hydraulically propelling the bi-directional pipeline pig, back-and-forth, within an enclosing non-magnetic and non-electrically conductive horizontal detection-conduit so as to cause the pipeline pig to make multiple traversals of a portion of the horizontal detection-conduit so that (i) one or more of the traversals are in a first direction and (ii) one or more of the traversals are in a second direction which is opposite to the first direction;

c. for each traversal of the multiple traversals:

i. acquiring magnetometer data by measuring, using the onboard Earth's-field magnetometer tool, distortions in the Earth's magnetic-field due to magnetic anomalies in locations that are both external to, and not in contact with, the horizontal detection-conduit;

ii. acquiring VLF EM resistivity data by measuring, using the onboard VLF EM resistivity subsurface-survey tool, a distortion of the VLF electromagnetic field caused by the presence of the tunnel at an external location located outside of the horizontal detection-conduit; and iii. monitoring an instantaneous position of the pipeline pig as it moves through the portion of the horizontal detection-conduit to acquire pig-position data; and d. computing a location of the tunnel from (i) both of the magnetometer data and the VLF EM resistivity data and (ii) correlations between the pig-position data and both of the magnetometer data and the VLF EM resistivity data.

2. The method of claim 1 wherein the tunnel is displaced from the horizontal detection-conduit by a displacement distance $CT_{DISPLACEMENT}$ which has a value of at least 1 meter.

3. The method of claim 2, wherein displacement distance $CT_{DISPLACEMENT}$ has a value of at least 3 meters.

4. The method of claim 3, wherein displacement distance $CT_{DISPLACEMENT}$ has a value of at least 5 meters.

5. The method of claim 1 wherein (i) the detected tunnel is displaced from the horizontal detection-conduit by a conduit-tunnel displacement distance $CT_{DISPLACEMENT}$; and (ii) a ratio $CT_{DISPLACEMENT}/CONDUIT_{WIDTH}$ between the conduit-tunnel displacement distance $CT_{DISPLACEMENT}$ and a width $CONDUIT_{WIDTH}$ of the horizontal detection-conduit is at least 1.

6. The method of claim 5, wherein the ratio $CT_{DISPLACEMENT}/CONDUIT_{WIDTH}$ is at least 3.

7. The method of claim 6, wherein the ratio $CT_{DISPLACEMENT}/CONDUIT_{WIDTH}$ is at least 5.

8. The method of claim 1 wherein the horizontal detection-conduit is at or above the surface, and a depth of the detected tunnel is at least 5 meters.

9. The method of claim 8 wherein the depth of the detected tunnel is at least 10 meters.

10. The method of claim 1 wherein the horizontal detection-conduit is in an open trench, and a depth of the detected tunnel is at least 5 meters.

11. The method of claim 10 wherein the depth of the detected tunnel is at least 10 meters.

12. The method of claim 10, wherein the horizontal detection-conduit comprises a spoolable conduit.

13. The method of claim 1, wherein the magnetometer tool comprises exactly one magnetometer.

14. The method of claim 1, wherein the magnetometer tool comprises a magneto-gradiometer.

15. The method of claim 1, wherein the computing includes stacking respective position-specific data from the multiple traversals so as to improve the accuracy of the computing, and each of the magnetometer data and the VLF EM resistivity data includes data acquired during a plurality of traversals in each of the first and second directions.

16. A system for remotely detecting a location of a subsurface tunnel, comprising:
  a. a bi-directional pipeline pig disposed within an enclosing non-magnetic and non-electrically conductive horizontal detection-conduit, the bi-directional pipeline pig being (i) operable to traverse, when propelled pneumatically or hydraulically by a propulsion system, a portion of the horizontal detection-conduit in each of a first direction and a second direction which is opposite to the first direction, and (ii) loaded with (A) an onboard Earth's-field magnetometer tool and (B) an onboard very low frequency (VLF) electromagnetic (EM) resistivity subsurface-survey tool;
  b. a control module for:
    i. controlling the propulsion system to propel the pipeline pig so as to make multiple traversals of the portion of the horizontal detection-conduit in each of the first and second directions,
    ii. causing the onboard magnetometer tool to acquire magnetometer data for each traversal of the multiple traversals by measuring distortions in the Earth's magnetic-field due to magnetic anomalies in locations that are both external to, and not in contact with, the horizontal detection-conduit,
    iii. causing the onboard VLF EM resistivity subsurface-survey tool to acquire VLF EM resistivity data for each traversal of the multiple traversals by measuring a distortion of the VLF electromagnetic field caused by the presence of the tunnel at a location external to, and not in contact with, the horizontal detection-conduit, and
    iv. monitoring, for each traversal of the multiple traversals, an instantaneous position of the pipeline pig as it moves through the portion of the horizontal detection-conduit, so as to acquire pig-position data; and
  c. a computing module comprising (i) one or more processors, and (ii) a non-transitory, computer-readable medium containing program instructions, which, when executed by the one or more processors, cause the one or more processors to compute a location of the tunnel from (A) both of the magnetometer data and the VLF EM resistivity data and (B) correlations between the pig-position data and both of the magnetometer data and the VLF EM resistivity data.

\* \* \* \* \*